June 26, 1951   J. H. ANDERSON   2,558,165
CUSHIONING DEVICE FOR ROCK DRILLS
Filed Oct. 17, 1947
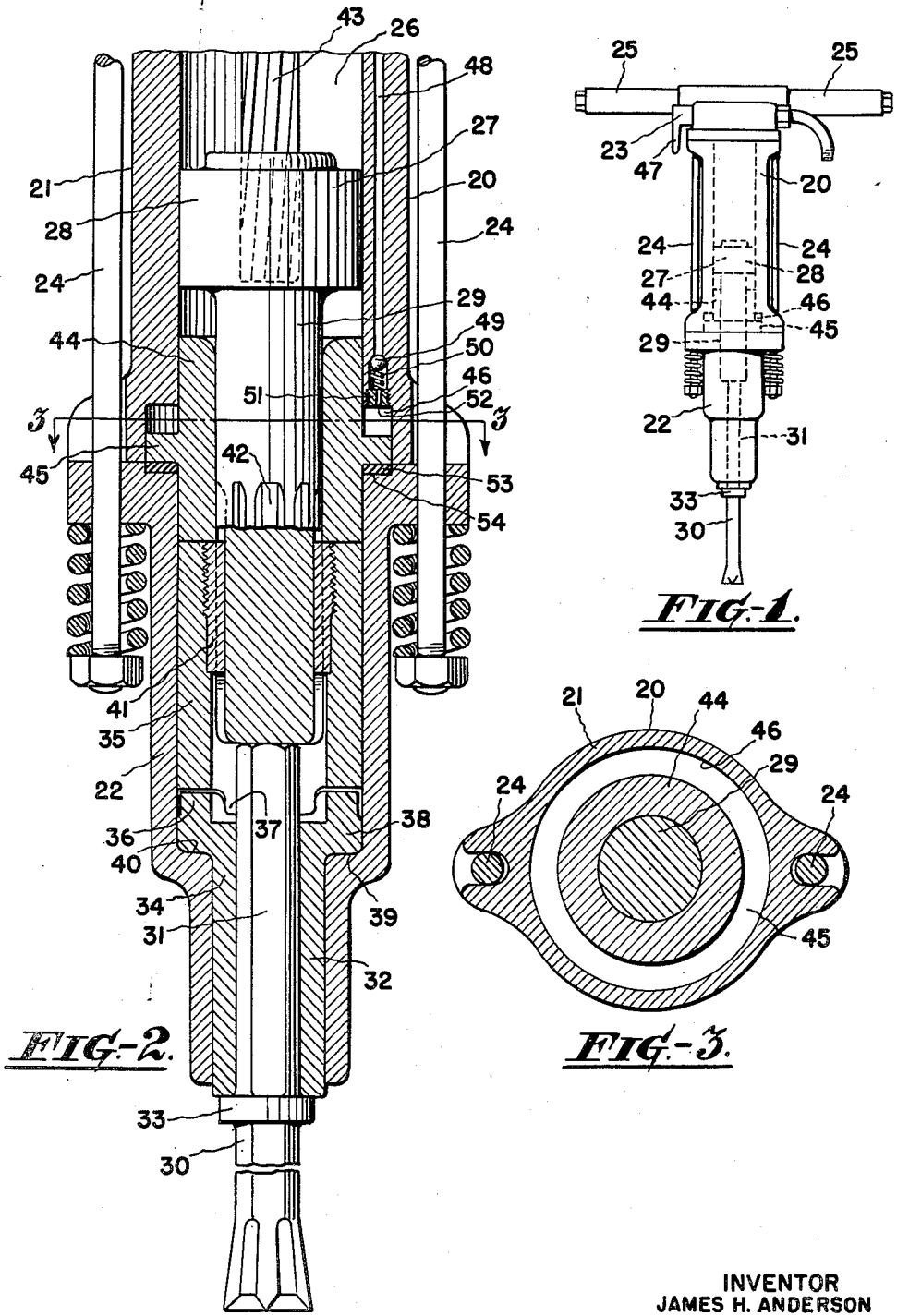
INVENTOR
JAMES H. ANDERSON
BY
HIS ATTORNEY.

Patented June 26, 1951

2,558,165

UNITED STATES PATENT OFFICE 2,558,165

CUSHIONING DEVICE FOR ROCK DRILLS

James H. Anderson, Easton, Pa., assignor to Ingersoll-Rand Company, New York, N. Y., a corporation of New Jersey Application October 17, 1947, Serial No. 780,438

3 Claims. (Cl. 121—13)

This invention relates to rock drills, and more particularly to a cushioning device for rock drills of the hammer type.

In rock drills of this type the working implement is capable of free sliding movement in the rock drill. Thus, at each blow of the hammer piston the working implement is projected forwardly and again rebounds from the working surface against the rock drill with great force. This is highly objectionable since it subjects the operator to severe shocks and jars that are not only annoying but extremely fatiguing.

It is accordingly an object of this invention to prevent the transmission to the operator of such shocks and jars as may be imparted to the rock drill by the action of the working implement actuated thereby.

Other objects will be in part obvious and in part pointed out hereinafter.

In the drawings accompanying this specification and in which similar reference numerals refer to similar parts, Figure 1 is a side elevation of a hand-held percussive rock drill equipped with a cushioning device constructed in accordance with the practice of the invention, Figure 2 is an enlarged view, in elevation, of the rock drill, partly broken away, and Figure 3 is a transverse view taken through Figure 2 on the line 3—3.

Referring more particularly to the drawings, 20 designates a rock drill comprising, as casing parts, a cylinder 21 and front and back heads 22 and 23, respectively. The heads 22 and 23 are clamped to the cylinder 21 by spring-pressed side bolts 24, and on the back head 23 are grip members 25 whereby the rock drill is held and guided with respect to the work.

Within the cylinder 21 is a piston chamber 26 for the accommodation of a reciprocatory hammer piston 27 that may be actuated by pressure fluid distributed to the ends of the piston chamber 26 by a suitable valve (not shown). The piston 27 is of the differential type having a head 28 and a stem 29 thereon to strike against a drill steel 30 the shank 31 of which extends into the front head 22. The shank is of polygonal shape to interlock against relative rotary movement with a chuck 32 in the front end of the front head. The chuck 32 projects slightly from the end of the front head, and the drill steel 30 has a collar 33 to abut the end of the chuck for limiting the distance that the shank 31 may extend thereinto.

The chuck 32 consists of two hollow parts 34 and 35 that have clutch members 36 and 37, respectively, interlockingly engaging each other to prevent relative rotary movement between them. The portion 38 of the chuck part 34 carrying the clutch members 36 is of enlarged diameter and its forward surface 39 seats upon a shoulder 40 within the front head 22 to limit movement of the chuck in a forwardly direction.

The chuck part 35 is preferably of the same diameter as the portion 38. The interior thereof is of somewhat larger diameter than the stem 29 to permit said stem to readily pass therethrough to strike against the shank 31, and in the rearward end of the chuck part 35 is a fluted nut 41 that is slidably interlocked with flutes 42 in the stem 29 for transmitting rotary movement from the piston 27 to the chuck. Such rotary movement of the piston is effected by suitable and well known rotation mechanism, only a portion of a rifle bar 43 of which is shown extending into the piston 27.

The chuck 32 is capable of a limited degree of endwise movement within the front head and such movement, in a rearwardly direction, is resisted by a front cylinder washer 44 forming a closure for the front end of the piston chamber 26. The washer 44 extends slidably into the opposed ends of the piston chamber and the front head and seats against the rearward end of the chuck part 35. The interior of the washer serves as a guide for the stem 29 of the piston, and on the periphery of said washer is an annular flange 45 that is slidable in a similarly shaped chamber 46 in the front end of the cylinder 21.

The chamber 46 is of a suitable length so that the flange 45 will be capable of a limited degree of endwise movement therein accordingly as the washer 44 is thrust rearwardly by the chuck, and in order to cushion such movement of the inner casing parts pressure fluid is introduced into the chamber 46 from a suitable source, as for example the throttle valve controlling the admission of pressure fluid into the rock drill and only the controlling lever 47 of which is shown in Figure 1. Such pressure fluid is conveyed to the chamber 46 by a passage 48, in the cylinder 21, opening into the rearward end of the chamber 46.

In order to prevent the pressure fluid from being expelled from the chamber 46 into the passage 48 by the pressure applied to the rock drill by the operator for pressing the drill steel against the work and the oppositely directed blows of the drill steel against the chuck the outlet end of the passage 48 is controlled by a spring-pressed check valve 49. The chuck valve 49 is in the form of a ball and the spring 50 tending to hold it seated over the mouth of the passage 48 is held in position by a plug 51 having an orifice 52 to communicate the passage 48 with the chamber 46.

In order to prevent the sharp impact of the flange 45 against a metallic surface during its forward movement a buffer 53 of any suitable yieldable material is disposed at the front end of the chamber 46, preferably in an annular recess 54 in the end of the front head 22.

In practice, when pressure fluid is admitted into the rock drill for actuating the piston 27, pressure fluid will also flow through the passage 48 and the orifice 52 into the rearward end of the chamber 46 and normally maintain the washer 44 and the chuck in their foremost limiting positions. Any shocks thereafter applied to the chuck by the drill steel when it recoils from the working surface will be absorbed by the pressure fluid in the chamber 46 instead of being transmitted to the grip members 25, as is the case in rock drills wherein the inner casing parts are uncushioned.

I claim:

1. In a cushioning device for rock drills, a casing having a piston chamber, a reciprocatory piston in the piston chamber, a chuck slidable endwise in the casing, a working implement reciprocable in the chuck to receive the blows of the piston and having a surface to abut an end of the chuck, a hollow reciprocatory closure for the end of the piston chamber for guiding the piston abutting the chuck and having an external flange, a cushioning chamber in the casing to slidably receive the flange, and a passage in the casing to convey pressure fluid into the rearward end of the cushioning chamber against the flange for cushioning the impact of the working implement against the chuck.

2. In a cushioning device for rock drills, a casing having a piston chamber, a reciprocatory piston in the piston chamber, a chuck slidable endwise in the casing, a working implement reciprocable in the chuck to receive the blows of the piston and having a surface to abut the chuck for limiting endwise movement of the working implement in one direction relatively to the chuck, a reciprocable closure for the end of the piston chamber abutting the chuck, a flange on the closure, a cushioning chamber in the casing to slidably receive the flange, a passage in the casing to convey pressure fluid into the rearward end of the cushioning chamber for cushioning the impact of the working implement against the chuck, means for preventing the escape of such pressure fluid from the cushioning chamber, and a yieldable buffer for the flange in the opposite side of the cushioning chamber.

3. In a cushioning device for rock drills, outer and inner casings movable endwise with respect to each other, a working implement reciprocable in the inner casing and having a shoulder to abut said inner casing, a hammer piston reciprocable in the casings for actuating the working implement, a cushioning chamber in one of the casings, a flange on the other casing lying within the cushioning chamber, a passage in the outer casing to admit pressure fluid into the cushioning chamber to act against the said flange for cushioning the impact of the working implement against the adjacent casing, and a check valve in the passage for entrapping such pressure fluid in the chamber.

JAMES H. ANDERSON.

REFERENCES CITED

The following references are of record in the file of this patent:

UNITED STATES PATENTS

| Number | Name | Date |
|---|---|---|
| 1,220,100 | Haeseler | Mar. 20, 1917 |
| 1,336,930 | Stage | Apr. 13, 1920 |
| 1,832,471 | Nell | Nov. 17, 1931 |
| 2,058,988 | Hulshizer | Oct. 27, 1936 |

FOREIGN PATENTS

| Number | Country | Date |
|---|---|---|
| 199,782 | Great Britain | June 25, 1923 |
| 356,930 | Great Britain | Sept. 17, 1931 |